United States Patent Office 3,173,947
Patented Mar. 16, 1965

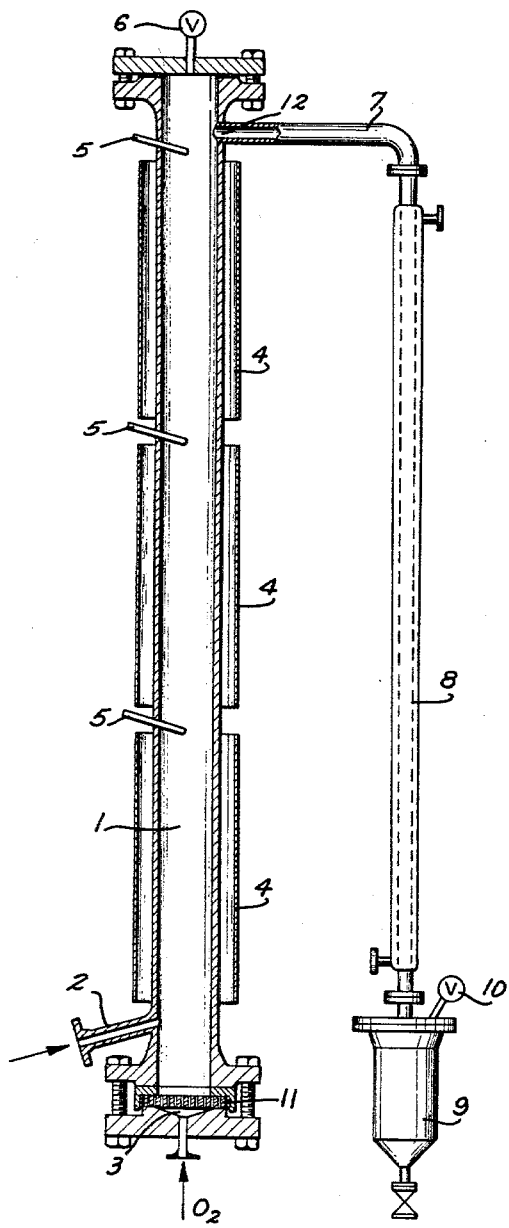

3,173,947
METHOD FOR OXIDIZING ORGANIC SUBSTANCES
Anton Benning, Essen, and Otto Grosskinsky, Dortmund, Germany, assignors to Bergwerksverband G.m.b.H., Essen, Germany
Continuation of application Ser. No. 506,599, May 6, 1955. This application June 27, 1960, Ser. No. 39,190
Claims priority, application Germany, May 12, 1954, B 30,990
6 Claims. (Cl. 260—524)

The present invention relates to a method for oxidizing organic substances and more particularly for oxidizing organic substances with nitric acid and for recovery of the same in a continuous process. This application is a continuation of our copending application Serial No. 506,599, filed May 6, 1955, now abandoned.

Organic compounds such as toluene, xylenes, p-cymenes, p-tolualdehyde, cyclohexanol and the like as well as coal and other fuels can be oxidized with nitric acid to the corresponding carboxylic acids without consuming any appreciable quantities of nitric acid, by simultaneously introducing oxygen, air or other free oxygen containing gases into the reaction mixture. It has been found that nitrous gases formed during the oxidation of an organic compound can be introduced, together with gases containing non-reacted free oxygen, into the lower portion of a nitric acid containing packed tower and that the nitrous gases can be reoxidized therein to nitric acid. Independently from the recovery of nitric acid by oxidation of nitrous gases it is then also necessary to separate and recover nitric acid which is contained in the reaction solution of the oxidized organic substance.

It is an object of the present invention to provide a method and apparatus for oxidizing organic substances with nitric acid, wherein substantially all of the originally introduced nitric acid is recovered in one single operation.

It is the further object of the present invention to provide a method and apparatus for oxidizing organic substances and recovering substantially all of the originally introduced nitric acid in a continuous process.

It is still another object of the present invention to increase the speed of the oxidation reaction and thereby the throughput capacity of an apparatus of given size.

Other objects and advantages of the present invention will become apparent from a further reading of the specification and the appended claims.

With the above objects in view, the present invention mainly consists in a method of oxidizing organic substances with nitric acid and recovering nitric acid, comprising the steps of passing an oxidizable organic substance and nitric acid along with a finely dispersed gas containing free oxygen upwardly through an elongated substantially vertical reaction vessel so as to form a reaction mixture including oxidized organic substance, water, remaining $HNO_3$ and a gas containing nitrogen dioxide and also containing free oxygen; withdrawing the reaction mixture from the upper portion of the reaction vessel, and passing at least the aqueous solution and the gas containing the nitrogen dioxide and the free oxygen downwardly through a cooled substantially vertical vessel so as to convert during downward flow of the water and the gas the nitrogen dioxide to nitric acid, thereby recovering substantially all of the original nitrogen of the nitric acid in the form of nitric acid.

The present invention also consists in an apparatus for oxidizing organic substances with nitric acid comprising, in combination, a pair of elongated substantially vertical reaction vessels each having upper and lower portions, inlet means located in the lower portion of one of the reaction vessels for introducing an oxidizable organic substance and nitric acid and also for introducing a gas containing free oxygen into the one of the reaction vessels, the inlet means being provided with dispersing means for dispersing the gas containing free oxygen, whereby upon passing of the oxidizable organic substance, the nitric acid and the gas upwardly through the one of the reaction vessels a reaction mixture including oxidized organic substance, water, remaining $HNO_3$ and a gas containing nitrogen dioxide and also containing free oxygen is formed, withdrawing means located at the upper portion of the one of the elongated vertical reaction vessels for withdrawing the reaction mixture from the same, and introducing means operatively connected to the withdrawing means and to the upper portion of the other of the elongated vertical reaction vessels for introducing at least the mixture of water and remaining $HNO_3$, and the gas containing the nitrogen dioxide and the free oxygen into the upper portion of the other of the reaction vessels, whereby upon passage downward of the aqueous solution and the gas through the other of the reaction vessels the nitrogen dioxide is converted to nitric acid.

According to the present invention the recovery of nitrous gases originating during the continuous oxidation of organic substances with nitric acid in a vertical reacton vessel is greatly facilitated and simplified.

Surprisingly, it has now been found that it is possible to recover substantially all of the nitric acid originally introduced into the oxidation process, in substantially its original concentration by passing the reaction mixture leaving an elongated substantially vertical reaction vessel in which the oxidation of the organic material takes place, downwardly through a cooled substantially vertical elongated second reaction vessel. The nitrous gases and the oxygen contained in the reaction mixture will form nitric acid while passing through the cooled second reaction vessel. The thus-formed nitric acid as well as any nitric acid which is still contained in the reaction mixture entering the cooled second reaction vessel can then be jointly separated from the cooled mixture leaving the second reaction vessel. In order to thus recover all of the originally introduced nitric acid it is not necessary to pass the entire reaction mixture through the cooled second reaction vessel. It is, however, necessary that all of the nitrous gases, any nitric acid still present at the end of the oxidation reaction, and quantities of free oxygen sufficient for converting the nitrous gases into nitric acid flow through the cooled second reaction vessel.

In many cases it will be advantageous to pass the entire reaction mixture through the second reaction vessel and thereafter to separate the oxidized organic substance and the nitric acid. However, in some cases, and especially if the oxidized organic substance is insoluble in nitric acid, it is preferred to separate the insoluble oxidized organic substance from the remainder of the reaction mixture before the remainder passes through the second cooled reaction vessel. The nitric acid reaching the lower portion of the cooled second reaction vessel may in either case be recovered in known manner, for instance by distillation or decantation. The recovered nitric acid can then again be introduced together with an organic substance into the first reaction vessel in which the organic substance is to be oxidized.

Thus, in accordance with the present invention, oxidation of organic substances can be accomplished in a continuous process having the advantages of simplicity in its execution and of simultaneous complete recovery of the nitric acid at one single point. Furthermore, the continuous operation in accordance with the method and apparatus of the present invention permits uninterrupted and consequently very economical oxidation. The use of elongated, substantially vertical reaction vessels allows for heating and cooling of the mixture to different temperatures in the upper, lower and intermediate portions of the reaction vessels so that at any time and in any portion of the reaction vessel the mixture can be maintained at the most advantageous temperature.

It is particularly important in accordance with the present invention to introduce the oxygen or oxygen-containing gas into the lower portion of the vertical reaction vessel in which the oxidation reaction is performed. Consequently the oxidizing gas rises through the reaction vessel in parallel flow with the organic substance and the nitric acid. Thus, the highest oxygen concentration is available when it is most needed, namely at the beginning of the oxidation. Thereby, the oxidation is intensified and accelerated. Accordingly, it is now possible in accordance with the present invention to perform oxidations with nitric acid which previously proceeded only incompletely or only when a considerable excess of nitric acid was applied. It follows that the simultaneous introduction of oxygen in parallel flow with the organic substance and the nitric acid considerably increases the throughput through the entire apparatus.

It is of decisive importance for the continuous oxidation process that the oxygen is introduced into the mixture of nitric acid and oxidizable organic substance in finely dispersed form so that turbulence and mixing of the reaction solution due to irregularly rising gas bubbles is avoided. Satisfactory completion of the oxidation reaction is greatly hampered or prevented if the oxidizing gas has a stirring effect on the mixture. Any such stirring or agitating of the reaction mixture will cause the intermixing of organic substance which has already been oxidized to the desired degree with incompletely oxidized organic substance. Consequently, a mixture of too strongly oxidized organic substance, of incompletely oxidized organic substance and of organic substance oxidized to the desired degree would be withdrawn from the reaction vessel.

By introducing the oxygen in finely divided form, and thereby preventing any movement other than the upward flow in the reaction mixture passing through the reaction vessel, unoxidized organic substance will come in contact with the highest concentration of oxygen. During the upward flow in the reaction vessel and as oxidization of the organic substance progresses, proportionate changes in the oxygen concentration will take place concurrently with the formation of nitrous oxides, and a definite relationship between the degrees of oxidation of the organic substance and the concentration of the oxidizing agents with which the organic substance comes in contact will be established.

This desirable and advantageous result can only be obtained by introducing the oxygen-containing gas in finely divided form into the lower portion of the reaction vessel. In a preferred embodiment of the present invention this is accomplished by passing the oxygen-containing gas into the reaction vessel through a foraminous body such as, for instance, a porous ceramic plate having pores of suitable size. Thus, the oxygen rises in parallel flow with the reaction mixture in the form of fine bubbles through the reaction vessel, and only organic substance which has been oxidized to the desired degree reaches the upper portion of the reaction vessel in which the oxidation takes place and leaves it through the withdrawing means located at the upper portion thereof. It is therefore also possible in accordance with the present invention to correlate the length of the elongated, substantially vertical reaction vessel, the speed of the oxidation process, the operating temperature and the speed of flow of the reacting substances so as to obtain highest efficiency during continuous operation. In this connection, it is important to note that the speed of reaction is accelerated in accordance with the present invention by finely dispersing the oxygen-containing gas in the reaction mixture and consequently creating a vastly enlarged reaction surface area.

The pressure in the entire apparatus is controlled by the pressure under which the oxygen-containing gas enters the reaction vessel and by pressure control valve means which in a preferred embodiment of the present invention are connected with collecting means for collecting the regenerated nitric acid. The pressure control valve serves for releasing gases to the extent necessary to keep pressure in the entire apparatus at the desired level. In a preferred embodiment of the present invention safety valve means are connected with the upper portion of the reaction vessel in which the oxidation takes place in order to release any excess pressure that might possibly be generated.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which the figure is a front elevation, partially in cross-section, of an oxidizing apparatus in accordance with the present invention.

Referring now to the drawing, the elongated substantially vertical reaction vessel 1 shown in cross-section is provided with inlet means 2 and 3 for the introduction of an oxidizable organic substance together with nitric acid and for the introduction of a free oxygen-containing gas. First inlet means 2 are shown for the introduction of the oxidizable organic substance and the nitric acid, and second inlet means 3 serve for introduction of the oxygen-containing gas. A porous ceramic plate 11 is included in the second inlet means 3 and serves as a foraminous body for finely dispersing the free oxygen-containing gas. While in the illustrated embodiment first inlet means 2 are shown as comprising a single tube through which a mixture of oxidizable organic substance and nitric acid is introduced into the reaction vessel 1, it is within the scope of the present invention that inlet means 2 may comprise a plurality of tubes for separately introducing the oxidizable organic substance and nitric acid. This is especially important when the oxidizable organic substance and the nitric acid are to be introduced into the reaction vessel at a temperature at which reaction between the organic substance and the nitric acid would immediately take place. In this case, in order to prevent any reaction outside of the reaction vessel 1 it is of course necessary to introduce the various components separately into reaction vessel 1. The several tubes of inlet means 2 may be arranged spaced from each other or mounted together as a bundle of tubes.

Temperature control means 4 are shown vertically spaced from each other, surrounding portions of reaction vessel 1. These temperature control means are to be used for heating or cooling individual portions of the elongated reaction vessel 1 so that the reaction mixture flowing through the reaction vessel 1 can be kept during each stage of the progressing oxidation at the most advantageous temperature.

Means 5 for measuring the temperature inside reaction vessel 1 are located at vertically spaced intervals along the elongated reaction vessel 1. These means 5 can be simple thermometers or temperature recording devices, and they can also be combined with means (not shown) for automatically adjusting temperature control means 4 to the desired temperature.

Safety valve means 6 arranged on top of reaction vessel 1 and operatively connected therewith serve for releasing any excess pressure from the apparatus thereby preventing build-up of pressure to a potentially dangerous level.

Withdrawing means 12 are located in the upper portion of elongated vertical reaction vessel 1 and are operatively connected with introducing means 7 leading to the other elongated vertical reaction vessel 8. The reaction mixture leaving reaction vessel 1 through withdrawing means 12 and introducing means 7 flows then downwardly through the other elongated reaction vessel 8 and is cooled during that downward flow.

Separating means (not shown) may be inserted or attached to introducing means 7 for separating an oxidized organic substance which is insoluble in nitric acid from the remainder of the reaction mixture. Then only the remainder of the reaction mixture having the insoluble oxidized organic substance removed therefrom flows downwardly through the elongated reaction vessel 8, and obstruction of reaction vessel 8 by deposits of insoluble oxidized organic substance is prevented.

During the downward flow of the reaction mixture, or at least of the nitrous gases, oxygen-containing gases and nitric acid emanating from reaction vessel 1, the mixture is cooled in reaction vessel 8, and the nitrous gases are regenerated to nitric acid. Consequently, the mixture leaving the lower portion of reaction vessel 8 contains substantially all of the nitric acid originally introduced into reaction vessel 1.

Collecting means 9 are operatively connected to the lower portion of reaction vessel 8 and serve for collecting of the nitric acid and also for collecting of the oxidized organic substance, unless the oxidized organic substance has been separated from the reaction mixture prior to passing the reaction mixture through reaction vessel 8.

Pressure control valve means 10 are operatively connected to collecting means 9. The pressure in the entire system including reaction vessel 1, withdrawing means 12, introducing means 7, reaction vessel 8 and collecting means 9 is controlled by the pressure under which the oxygen-containing gas enters reaction vessel 1 through inlet means 3 in conjunction with pressure control valve means 10.

All parts of the entire apparatus which may come in contact with any portion of the reaction mixture are preferably made of material resistant to nitric acid.

The apparatus of the present invention thus permits reactions requiring superatmospheric pressure to be performed with greatest operative safety, particularly since only very few valves are required.

In cases where the nitric acid concentration has to be varied during the upward flow of the reaction mixture through reaction vessel 1, a plurality of inlet tubes are provided as part of inlet means 2 suitably spaced from each other in vertical direction for the introduction of nitric acid or of diluents.

The apparatus and method of the present invention offers considerable unobvious advantages for the oxidation of organic substances such as for instance the oxidation of coal. In this case incompletely decomposed and oxidized particles of coal are kept in suspension in the reaction solution until the particles are dissolved. At moderate speed of flow undissolved particles of coal do not reach the upper portion of reaction vessel 1 and consequently do not enter reaction vessel 8 or the separating means for insoluble oxidized organic substances. Undissolved coal remains in the proper reaction zone within reaction vessel 1, while dissolved coal which has been oxidized to low molecular weight carboxylic acids is removed from reaction vessel 1 without any undue delay which might lead to a further decomposition of these valuable low molecular weight carboxylic acids.

In the oxidation of coal it is advantageous to vary the temperature during the reaction. The reaction starts at about 90 to 100° C. while the main reaction preferably takes place at a temperature of between 120° and 140° C. Therefore, the mixture of finely pulverized coal and nitric acid is preferably first brought to a temperature of about 100° C. and the temperature of the mixture is then increased to about 150° C. during the upward flow of the mixture through reaction vessel 1. This can easily be accomplished by correspondingly adjusting the vertically spaced temperature control means 4. Thus the method and apparatus of the present invention are especially suitable for the oxidation of coal or other fuels.

The method and apparatus of the present invention can advantageously be used for the oxidation of solid, liquid or gaseous organic substances. Because of the simultaneous introduction of finely dispersed oxygen into the lower portion of reaction vessel 1 it is possible to operate simply and effectively in a continuous process of great capacity and dependability.

A very great number of different oxidation processes can thus be performed in the apparatus, and in accordance with the method, disclosed in the present invention. The following four examples are given as illustrative only, the scope of the invention, however, not being limited to the specific examples.

*Example 1*

100 parts of hard coal, pre-oxidized with air, are mixed with 600 parts by volume of 30% nitric acid and immediately thereafter introduced into the lower portion of reaction vessel 1 in such quantities that the upward flow through reaction vessel 1 requires approximately 2 hours. Simultaneously air is introduced under pressure in finely dispersed form into the lower portion of reaction vessel 1, and the pressure in the entire apparatus is kept at 5 atmospheres by suitable adjustment of pressure control valve means 10. The lower portions of the vertically spaced temperature control means 4 are heated to about 100° C. and the upper portions thereof to about 150° C. The reaction mixture leaving reaction vessel 1 is cooled during downward flow through reaction vessel 8 and a solution is obtained in collecting means 9 which, after distilling-off of the nitric acid contains 95 parts of oxidized organic substance for each 1000 parts of originally introduced coal and nitric acid mixture. 40 parts of the oxidized organic substance thus obtained consist of low molecular weight carboxylic acids comprising mainly a mixture of succinic, glutaric and adipic acids as well as a large proportion of benzene carboxylic acids, containing between 2 and 6 carboxyl groups. The distilled-off nitric acid is recovered in a concentration of 29.5% and can be re-used in the oxidation process.

*Example 2*

A mixture of 100 parts of tolualdehyde and 700 parts by volume of 30% nitric acid is passed under atmospheric pressure and at a temperature of 100° C. through reaction vessel 1. Simultaneously air is introduced in finely dispersed form into the lower portion of reaction vessel 1. After passing through the apparatus, crystallized toluic acid is obtained in collecting means 9 and separated by filtration. The nitric acid is recovered with a loss of only 2 grams per 100 grams of originally introduced nitric acid. It is accordingly replenished and again used for oxidation of additional quantities of tolualdehyde. The thus obtained toluic acid has an acid number of between 405 and 408, and a melting point of between 175 and 180° C. It is obtained in a yield of 100% based on tolualdehyde used.

By carrying out the same oxidation process at a pressure of between 5 and 10 atmospheres and at a temperature of between 160 and 170° C., pure terephthalic acid having an acid number of 670 is obtained in a quantity corresponding to about 125% of originally introduced tolualdehyde, or in a yield corresponding to about 90% of the theoretically obtainable yield.

*Example 3*

A mixture of 100 parts of toluic acid and 800 parts by volume of 40% nitric acid are passed through reaction vessel 1 at a pressure of 10 atmospheres and at a temperature of between 160 and 170° C. The speed of flow is so adjusted that the mixture remains in reaction vessel 1 for about 2 hours. Simultaneously oxygen is introduced in finely dispersed form into the lower portion of the reaction vessel. Between 125 and 130 parts of terephthalic acid per 1000 parts of original mixture are collected in the separating means which are attached to the introducing means 7 between reaction vessels 1 and 8.

Under similar conditions p-xylene is substantially completely oxidized to terephthalic acid.

*Example 4*

5 parts by weight of 45% nitric acid and 1 part by weight of cyclohexane are introduced through separate inlets into the lower portion of reaction vessel 1. The supply of these substances to the reaction vessel is so controlled that the reaction solution is heated in the reaction vessel for about 2 hours to 100° C. at a superatmospheric pressure of 2 atmospheres. Simultaneously finely dispersed air is introduced into the lower portion of reaction vessel 1 and the pressure in the apparatus is maintained at 2 atmospheres by the pressure of the introduced air in conjunction with the operation of pressure control valve 10. A 70% yield of adipic acid is obtained. The by-products consist primarily of glutaric and succinic acids.

Under similar conditions cyclohexanol, or a mixture of cyclohexanol and cyclohexanone can be oxidized to adipic acid, yielding in excess of 93%.

It will be understood that each of the elements described above, or two or more together, may also find a useful application in other types of apparatus for oxidizing organic substances differing from the types described above.

While the invention has been illustrated and described as embodied in a method and apparatus for oxidizing organic substances with nitric acid and for recovery of the same in a continuous process, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for oxidizing organic substances with liquid aqueous nitric acid at elevated temperatures and under superatmospheric pressure, and regenerating the nitric acid thereby reduced to nitrogen oxide by reacting the latter with free oxygen and water, the combination of steps which comprises:
    (a) continuously forming a mixture of the organic substance, an amount of the nitric acid in excess of that required for the oxidation, and finely dispersed therein a gas containing the free oxygen in the lower portion of an elongated, substantially vertical, reaction vessel,
    (b) continuously passing said mixture in a substantially quiescent state upwardly through said reaction vessel under the super-atmospheric pressure while maintaining the elevated temperatures to form and maintain an aqueous reaction mixture including oxidized organic substance unreacted nitric acid, nitrogen oxide, water and free oxygen,
    (c) continuously withdrawing said reaction mixture from the upper portion of said reaction vessel,
    (d) continuously passing at least the liquid and gaseous constituents of said reaction mixture downwardly through a second substantially vertical vessel while cooling to regenerate by reaction of the nitrogen oxide, water and free oxygen, substantially all of the nitric acid consumed in step (a),
    (e) withdrawing the recovered substances from the lower portion of said second vessel, while maintaining the selected super-atmospheric pressure throughout the system, and
    (f) separating the nitric acid from the other substances recovered in step (e).

2. A process as claimed in claim 1, wherein the gas containing free oxygen is introduced into the liquid constituents of the mixture formed in step (a) through a foraminous body located at the lower portion of the reaction vessel.

3. A process as claimed in claim 1, wherein the oxidized organic substance formed in step (b) is insoluble in the unreacted nitric acid and is continuously separated from the fluid constituents of the reaction mixture between steps (c) and (d).

4. A process as claimed in claim 1, wherein the nitric acid separated in step (f) and is recycled to step (a).

5. In a process for oxidizing organic substances capable of being oxidized with aqueous nitric acid to carboxylic acids while reducing the nitric acid to at least one nitrogen oxide, wherein such organic substances are treated with adequately concentrated liquid aqueous nitric acid at temperatures and pressures sufficiently high to achieve such oxidation, and the nitric acid thereby reduced to nitrogen oxide is regenerated by reacting the latter with sufficient amounts of free oxygen and of water, the combination of steps which comprises:
    (a) continuously forming a mixture of the organic substance, an amount of the nitric acid in excess of that required for the oxidation, and finely dispersed therein a gas containing the free oxygen in the lower portion of an elongated, substantially vertical, reaction vessel,
    (b) continuously passing said mixture in a substantially quiescent state upwardly through said reaction vessel under the superatmospheric pressure while maintaining the elevated temperatures to form and maintain an aqueous reaction mixture including oxidized organic substance unreacted nitric acid, nitrogen oxide, water and free oxygen,
    (c) continuously withdrawing said reaction mixture from the upper portion of said reaction vessel,
    (d) continuously passing at least the liquid and gaseous constituents of said reaction mixture downwardly through a second substantially vertical vessel while cooling to regenerate by reaction of the nitrogen oxide, water and free oxygen, substantially all of the nitric acid consumed in step (a),
    (e) withdrawing the recovered substances from the lower portion of said second vessel, while maintaining the selected superatmospheric pressure throughout the system, and
    (f) separating the nitric acid from the other substances recovered in step (e).

6. A process for oxidizing toluic acid to terephthalic acid which comprises:
    (a) continuously forming a mixture of (1) toluic acid, (2) an amount of approximately 40% aqueous nitric acid in excess of that required to convert the toluic acid to terephthalic acid and (3) an amount of finely dispersed oxygen in excess of that required to reoxidize the nitrous gases formed, in the lower portion of an elongated, substantially vertical reaction vessel,
    (b) continuously passing said mixture in a substantially quiescent state at a pressure of about 10 atmospheres and at a temperature of between 160 and 170° C. upwardly through said reaction vessel at such a rate that the mixture remains in said reaction vessel for about two hours,
    (c) continuously withdrawing the reaction mixture formed from the upper portion of said reaction vessel, (d) continuously separating the solid terephthalic acid from said reaction mixture, (e) continuously passing the liquid and gaseous constituents of said reaction mixture downwardly through a second substantially vertical vessel while cooling to regenerate by reaction of the nitrogen oxide, water and free oxygen present therein substantially all of the nitric acid consumed in step (a), and (f) withdrawing the regenerated nitric acid from the lower portion of said second vessel, while maintaining the selected superatmospheric pressure throughout the system.

References Cited in the file of this patent

UNITED STATES PATENTS

| | | |
|---|---|---|
| 1,332,028 | Coblenz et al. | Feb. 24, 1920 |
| 1,949,462 | Fogler | Mar. 6, 1934 |
| 2,543,446 | Egly | Feb. 27, 1951 |
| 2,555,410 | Howard | June 5, 1951 |
| 2,636,899 | Burrows et al. | Apr. 28, 1953 |
| 2,662,908 | Logan | Dec. 15, 1953 |
| 2,674,338 | Lindsay et al. | Apr. 6, 1954 |
| 2,839,575 | Fetterly | June 17, 1958 |

FOREIGN PATENTS

| | | |
|---|---|---|
| 698,157 | Great Britain | Oct. 7, 1953 |
| 747,417 | Great Britain | Apr. 4, 1956 |